United States Patent [19]
Albright

[11] Patent Number: 4,732,184
[45] Date of Patent: Mar. 22, 1988

[54] LUMBER SAW-SIZING MACHINE

[76] Inventor: Russell E. Albright, 28852 Modjeska Canyon Rd., Orange, Calif. 92667

[21] Appl. No.: 886,722

[22] Filed: Jul. 18, 1986

[51] Int. Cl.⁴ .............................................. B27C 1/08
[52] U.S. Cl. .................... 144/361; 144/1 D; 144/3 R; 144/115
[58] Field of Search ............. 144/2 D, 1 D, 2 R, 3 R, 144/123, 358, 359, 115, 200 J, 369; 15/236 R, 236 B; 29/78, 79, 80

[56] References Cited

U.S. PATENT DOCUMENTS

| | | | |
|---|---|---|---|
| 3,561,509 | 2/1971 | Hayden | 144/123 |
| 4,077,448 | 3/1978 | Hasenwinkle et al. | 144/2 D |
| 4,116,248 | 9/1978 | Erwin | 144/123 |

*Primary Examiner*—E. R. Kazenske
*Assistant Examiner*—Hien H. Phan
*Attorney, Agent, or Firm*—Plante Strauss Vanderburgh

[57] ABSTRACT

There is disclosed a machine for saw-sizing of lumber and a method for its use. The machine has a frame and a work table surface which supports at least one and, preferably four, bandsaws. The bandsaws are each positioned at an incident angle from 20° to about 80° to the surface of the lumber which is fed through the machine. The lumber is fed from the back side or back edge of the bandsaw saw blades. The machine is specifically designed for a single pass sizing of all four sides of lumber with two vertical bandsaws and two horizontal bandsaws; the horizontal bandsaws are positioned to size the bottom and top surfaces of the lumber while the vertical bandsaws are positioned to size the opposite vertical sides of the lumber. The method comprises passing the lumber through the machine from the back edge of the bandsaw blades to drag the lumber against the bandsaw blades. This results in a rough saw sized texture to the lumber without any significant change in its dimensions.

14 Claims, 4 Drawing Figures

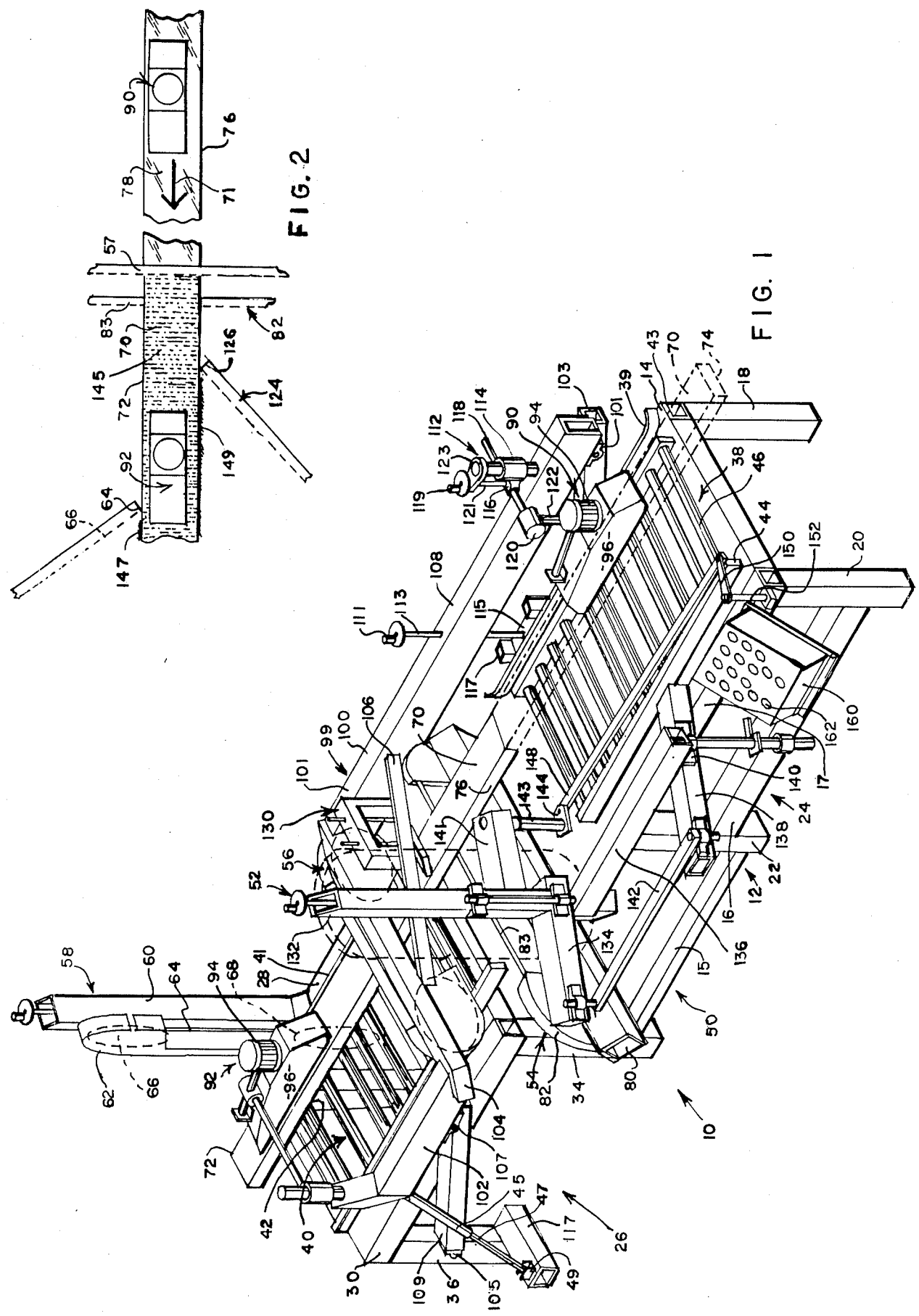

LUMBER SAW-SIZING MACHINE

BACKGROUND OF THE INVENTION

1. Field of the Invention

This invention relates to a machine for saw sizing lumber and, in particular, to a machine suitable for use at lumber yards and retail locations.

2. Brief Statement of the Prior Art

Saw-sized lumber is commonly used where a roughened texture or rustic appearance is desired. Traditionally, saw-sizing of lumber is accomplished when the lumber is cut at the lumber mill and the saw-sized lumber is only available by special order, often requiring advanced orders and special handling.

Some attempts have been made to provide machines and tools capable of saw-sizing lumber at remote locations. Saws which are used at lumber mills for this purpose are not suited for resurfacing of smooth surfaced lumber as these saws must remove a substantial thickness from each side of the lumber. Typical of recent attempts is that represented by U.S. Pat. No. 4,498,512 which discloses a saw-sizing hand tool. While this device is suited for on-site dressing of lumber at a construction site, it is not well suited for resurfacing large quantities of lumber. Some attempts have also been made using circular saws with special settings of the teeth of the saw to achieve a roughened surface appearance. Use of circular saw blades in this fashion, however, is not desirable as the finished product has residual circular saw cuts or patterns, thereby detracting from the appearance of the product.

Other attempts have been made to use conventional bandsaws to surface dress lumber, usually by passing the lumber against the back side of a bandsaw blade which is at a slight incident angle to the lumber. This method is not usually satisfactory as it is inefficient, requiring four separate passes of the lumber for complete surface dressing, and is thus very labor intensive. Additionally, manual feeding of the lumber is not desirable as irregularities in the feeding rate can cause objectionable grooves and saw patterns on the surface of the lumber.

BRIEF STATEMENT OF THE INVENTION

This invention comprises a method for saw-sizing of lumber and a machine to practice the method. The saw-sizing machine of the invention includes a frame, and a coextensive table surface, preferably formed with a pair of longitudinal rails carrying spaced-apart rollers with at least one, and preferably, four bandsaws positioned in cutting relationship to a surface of the lumber. The bandsaws are positioned at an incident angle from twenty to about eighty degrees, preferable 45 degrees, to the surface of lumber which is fed through the machine towards the backside of the bandsaw blades. Preferably a bandsaw is positioned in cutting relationship to each of the four surfaces of the lumber so that a single piece of lumber can be completely resurfaced in a single pass through the machine. The band saw which is positioned to dress the undersurface of the lumber is fixedly positioned on the frame, and one of the two bandsaws which are positioned to dress the vertical sides of the lumber is similarly fixedly mounted on the frame. The opposite vertically positioned bandsaw, however, is mounted on a frame subassembly by linkage arms that permit its free lateral displacement relative to the frame, and biasing means are provided to resiliently bias the bandsaw frame subassembly towards the lumber piece to maintain the cutting blade in contact with the lumber piece. The horizontally positioned bandsaw which is located to dress the top surface of the lumber is also mounted on a frame subassembly that permits its vertical displacement. This subassembly has an elevational adjustment member that orients the bandsaw to the top surface of the lumber. The machine is also provided with suitable lumber feeding means which positively feeds the lumber through the machine.

The method of the invention comprises passing lumber against the cutting teeth of a bandsaw which is oriented at an angle from twenty to eighty degrees, preferably forty-five degrees to the surface of the lumber, in a direction from the backside of the bandsaw blade. This drags the lumber against the bandsaw blade at the aforementioned incident angle. The lumber which is dressed in accordance with the method by passing it through the machine of the invention has a roughened texture closely comparable to saw-sized lumber available by special order from lumber mills. The dimensions of the lumber are unchanged by the treatment as the saw only roughens the surface of the lumber. The surfaces of the dressed lumber although roughened, are entirely free of circular saw patterns and have a very desirable rustic and weathered appearance.

BRIEF DESCRIPTION OF THE DRAWINGS

Referring now to the drawings, the invention is illustrated by:

FIG. 1 is a perspective view of the machine of the invention;

FIG. 2 is a view of the incident angles of the bandsaw blades to the lumber;

DESCRIPTION OF PREFERRED EMBODIMENTS

Figure 3:
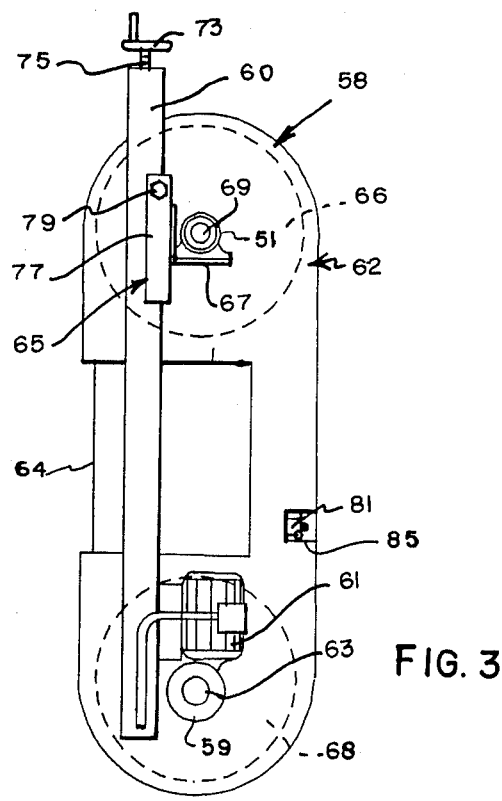
FIG. 3 is a view of the bandsaw illustrating greater detail of the bandsaw elements.

Referring to FIG. 1, the saw-sizing machine 10 of the invention is illustrated in a perspective view. As there illusrated, the machine includes a frame, generally indicated at 12 which has opposite, horizontal rail members 16 and 17 supported on upright legs 18, 20 and 22. The upper frame members are discontinuous, forming a forward sub-frame 24 and a rear sub-frame 26 which are connected with lower rail members such as 15 on each side.

The rear sub-frame 26 is similarly constructed with opposite, horizontal rails 28 and 30 and vertical legs 42, 34 and 36.

Each of the sub-frames 24 and 26 support a longitudinal, coextensive roller assembly, generally identified at 38 and 40 for each of the forward and rear sub-frames, respectively. Each roller assembly has opposite, longitudinal rails 43 and 44 which rotatably support a plurality of rollers 46. The rollers are mounted for free rotation on suitable bearings, (not shown) which are mounted on shafts extending between the longitudinal, opposite rails 43 and 44 of each of the roller assemblies. At one side, fences 39 and 41 are mounted on each roller assembly.

The center station, indicated at 50, between the sub-frames is generally open, providing a location for the laterally adjustable vertical bandsaw subassembly 52, and for the fixedly mounted horizontal bandsaw assembly 54. In FIG. 1, the laterally adjustable, vertical bandsaw is in broken lines for clarity of the illustration, and its support has been moved away from the edge 76 of the lumber 70.

The horizontally, adjustably mounted bandsaw and its subassembly 56 are mounted at the forward end of the rear sub-frame 26. The fixedly positioned, vertical bandsaw subassembly 58 is mounted at the rear of the rear sub-frame 26. To this end, the longitudinal rail 28 of sub-frame 26 supports a vertical standard 60 fixedly mounted thereon, and the fixedly positioned vertical bandsaw 62 is secured to this vertical standard 60. In this position, the vertical bandsaw 62 is oriented with its saw blade 64 inclined at an angle of from 20 to about 80 degrees, preferably 45 degrees, to the vertical side 72 of number 70 which is guided against fences 39 and 41 as it is passed through the mechine. The upper and lower bandsaw wheels 66 and 68 of bandsaw 62 are shown in phantom lines.

The forward legs such as 34 of the rear sub-frame 26 fixedly support the horizontal beam 80 to which is fixedly secured the horizontal bandsaw 82 which has its blade 83 also oriented at the aforementioned incident angle to the under surface 74 of lumber 70 passed through the machine.

The laterally movable, vertical bandsaw, which is shown only in phantom lines and removed from its cutting position is identical to bandsaw 62, and is mounted to the machine by bandsaw subassembly 52. Subassembly 52 includes a vertical standard 132 that is fixedly secured to cross bar 134 and is pivotally secured to the rear end of longitudinal bar 136. The forward end of bar 136 is pivotally mounted to a fixedly secured arm 138, that is carried on the upper longitudinal rail 17 of the forward sub-frame 24. Pivot blocks such as 140 are provided on arm 138 for the pivotal mounting of longitudinal bars 136 and 142. The resulting subassembly of lateral bar 134, fixed position bar 138 and the longitudinal bars 136 and 142 thus form a parallelogram having one corner fixedly secured to the machine sub-fame 24. The vertical standard 132 supports the vertical bandsaw and also has a fixedly mounted arm 141. Arm 141 distally supports rod 143 which carries, at its lower end, plate 144. Plate 144 serves as a bearing guide that rides on the vertical surface of 76 of lumber 70 which is passed through the machine. The vertical bandsaw subassembly 52 is retracted from its normal operational position for purposes of illustration. Plate 144 is pivotally secured to the end of arm 148. This arm is in distal, pivotal engagement with are 150 carried on the upper end of post 152, which is located at the front of the machine.

The horizontal bandsaw subassembly 56 is vertically adjustable on the machine. For this purpose, the subassembly includes a beam assembly 99 of forward longitudinal beam 100 and rear longitudinal beam 102 which are interconnected by a cross beam 104. In the assembly, beam 104 is mounted at the aforementioned angle of inclination to the lateral axis of the machine. The horizontal bandsaw 82 with its blade 83 is mounted on cross beam 104. Diagonal bracing, such as brace member 106 can be provided for dimensional stability of this beam assembly 99 of beams 100, 102 and 104.

The beam assembly 99 is supported on the machine sub-frames 12 and 26 by forward arm 103 and rear arms such as 109. A duplicate rear arm (not shown) is on the opposite side of the machine, attached between the rear end of beam 100 and the rear sub-frame 26. These arms are pivotally secured to their respective beams 100 and 102 by pivot blocks such as 101 and 107, respectively. The opposite ends of each of the arms 103 and 109 are pivotally mounted on their respective sub-frames by similar pivot blocks such as 105, thereby permitting freedom of vertical movement of the beam assembly 99 of frames 100, 102 and 104 while maintaining this beam assembly in parallel orientation to the working surface of the table, defined by the two roller assemblies 38 and 40. The vertical position of the beam assembly is adjustable by hand wheel 111 that is secured to vertical lead screw 113 which extends in threaded engagement through beam 100 and into a fixed retainer 115 which is mounted on horizontal rail 14 by frame 117.

The horizontal frame assembly 99 of beams 100, 102 and 104 is provided with a suitable dampening mechanism for controlling the rate of movement of this subassembly. This dampening mechanism comprises a shock absorber formed with a cylindrical casing 45 and a slidably received piston member on the end of arm 47, which is distally secured by pivotal mounting bracket 49 to a cross beam 117 located near the lower end of leg 36 of the rear of sub-frame 26.

The machine also includes a lumber feeding mechanism. A feeding mechanism is provided for each of the sub-frames and these are 90 and 92 on the drawing. Each feeding mechanism comprises a housing 96 which, on its undersurface supports a plurality of horizontal rollers which are rotatably mounted on its frame. These rollers are positioned to be in bearing contact with the top surface of lumber 70 which is passed through the machine. Each feeding mechanism includes a drive motor 94 which is mounted on the top of the drive mechanism and which is connected by a suitable gear train, preferable with a worm drive gear, to one or more of the rollers on the under surface of the feed mechanism. The feed mechanism thus described is a conventional unit commercially available under the trace designation.

The forward feeding mechanism 90 is adjustably secured to the forward end 108 of beam 100. For this purpose, beam 100 has a fixedly mounted post 110 that receives a slidably mounted clevis bracket 112 formed with sleeve 114 and cross sleeve 116. A hand wheel 119 which is secured on lead screw 121 that extends in threaded engagement thorough end cap 123. The screw is secured to the bracket 112, whereby movement of the hand wheel 119 moves the clevis bracket 112 on post 110. The bracket 112 can be locked at any selected position by a suitable means, e.g., set screws or a cam lever (not shown). The cross sleeve 116 of clevis bracket 112 slidably receives rod 118 which is distally received in bracket 120 that is mounted on post 122 which is fixedly secured to the forward drive mechanism 90. A similar hand wheel and lead screw (not shown) can be provided to extend or retract rod 118 in cross sleeve 116, and set screws or a cam lever can also be provided to lock the rod at any selected position.

Although not shown in the illustration, the machine 10 is provided with suitable motive power, preferably electrical power through a control terminal 160 having a control plate with a plurality of operator control switches, 162. Each of the bandsaws is provided with an independent drive motor which is directly coupled to one of the bandsaw wheels of its respective bandsaw. Also, as previously mentioned, each of the feeding mechanisms 90 and 92 have independent drive motors such as 94, and each of these are on independent opertor control through the control terminal 160.

Referring now to FIG. 2, the position of the lumber and bandsaws is schemtically illustrated. The lumber 70 is illustrated as it is passed through the machine in the direction indicated by the arrow 71. The forward feeding mechanism 90 and the rear feeding mechanism 92 are illustrated in this plan view resting on the lumber as it is passed through the machine. Each of the four bandsaws is also shown in the illustration. The fixedly positioned, lower horizontal bandsaw 82 has bandsaw blade 83 which is oriented at the aforementioned angle, preferably at about forty-five degrees to the undersurface of the lumber 70. The vertically adjustable, upper horizontal bandsaw has its bandsaw blade 57 at the angle, preferably at about forty-five degrees, to the top surface 78 of lumber 70. The fixedly positioned, vertical bandsaw has its bandsaw bland 64 at the aforementioned angle, preferably about forty-five degrees, to the vertical surface 72 of lumber 70. This illustration also shows, in phantom lines, the relative position of the bandsaw wheels such as 66. The laterally adjustable, vertical bandsaw generally identified as 124, has its bandsaw blade 126 at the aforementioned angle, preferably about forty-five degrees, to the remaining vertical side 76 of the lumber 70. As the lumber is passed through the machine, the surface texture of the lumber is changed, from the smooth surface lumber fed to the machine, to a roughened texture which is generally indicated by the broken lines 145, 147, and 149 in the illustration.

Referring now to FIG. 3, the bandsaw construction is illustrated in greater detail. The bandsaw 62 is identical in construction to the other three bandsaws used in the machine. The bandsaw includes top and bottom saw blade wheels 66 and 68 which are mounted on upper and lower shafts 69 and 63. The upper shaft is mounted in a pillow block 57 that is supported on angle plate 67. Angle plate 67 is vertically slidably mounted on vertical standard 60 and is attached to the end of lead screw 75 which extends through the upper end of standard 60. A hand wheel 73 is attached to the upper end of the lead screw 75 whereby the vertical position of angle plate 67 (and tension on bandsaw blade 64) is adjustable. The tilt of upper wheel 66 is adjustable by angle bracket 77, which is also attached to angle plate 67. A Machine screw 79 extends through the upper end of angle bracket 77 and advancing or retracting machine screw 79 in bracket 77 provides a controllable tilt adjustment of upper wheel 66, thereby permitting adjustment for proper running of the bandsaw blade 64.

The lower wheel 68 is fixedly mounted on a shaft 63 which extends into gear box 59 which contains a worm drive gear on the end of a power input shaft from electrical motor 61.

Each bandsaw preferably includes one or more blade guides 81 which are located in a cutout 85 in the protective side panels of the bandsaw. Conventional guides such as a Model 20 Ball bearing Bandsaw Guide from Paddock Tool Company, Inc., 1708 Central Ave., Kansas City, Kans. are used.

Figure 4:
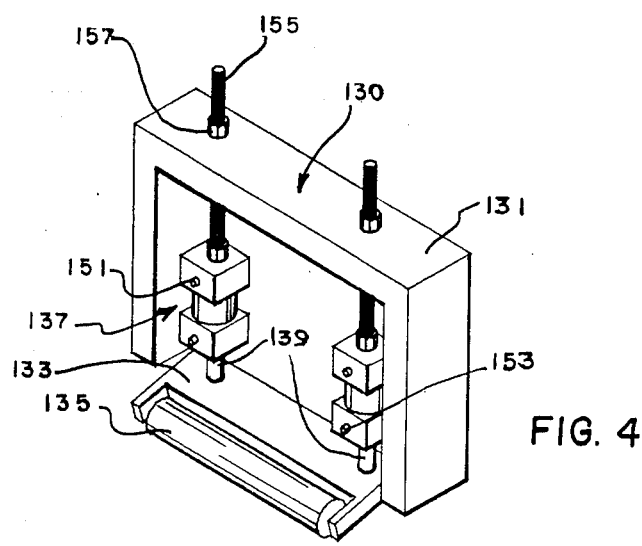
FIG. 4 is a view of a roller hold down element of the machine.

As previously mentioned, a hold down roller 130 is provided on the frame assembly 99. This roller assembly is shown in greater detail in FIG. 4. The roller assembly 130 includes an inverted U-shape frame 131 which supports a roller 135 and roller platen 133. The roller platen is vertically adjustable and is supported on the lower ends of shafts 139 which extend from hydraulic cylinders 137. Each cylinder 137 has inlet and outlet ports 151 and 153 for attachment of supply conduits for hydraulic fluid, thereby providing a controlled extension of the roller platen 133. The two cylinders are supported from the frame 131 of the assembly by threaded posts 155 which are threadably received in the frame 131, thereby permitting vertical adjustment of the subassembly of roller platen and hydraulic cylinders. Lock nuts 157 can be provided to secure the positions of the posts 155 to frame 131.

The machine of the invention provides for saw-sizing of smoothly dressed lumber without any significant changes in the dimensions of the lumber. It is particularly advantageous for use in resurfacing of previously dressed, smooth surfaced lumber. For this purpose, it is particularly intended for installations at lumber yards and retail establishments and its relatively simple construction and low capital cost provide suitable adaptation for this purpose. The machine is highly efficient and can handle lumber and completely dress all four surfaces of the lumber in a single pass. Alternatively, the operator can selectively dress any one, two or three sides of the lumber simply by positioning the respective bandsaw assembly out of position for those surfaces which are not to be saw-sized. The machine is highly efficient and is versatile in its ability to accept a wide variety of sizes, including lumber with thicknesses from one-half to twelve inches and widths from two to about twenty-four inches and of any suitable length. The machine can readily be used with a singly operator and with one or more workmen to place the lumber on the forward sub-frame table and to remove the resurfaced lumber discharged from the machine.

The invention has been described with reference to the presently preferred and illustrated embodiment thereof. It is not intended that the invention be unduly restricted by this illustration of the presently preferred embodiment. Instead, the invention is to be defined by the means, and steps, and their obvious equivalents, set forth in the following claims.

What is claimed is:

1. A method for rough surface dressing of opposite surfaces of lumber without significantly altering its dimensions which comprises:
   a. placing said lumber on a bandsaw cutting fixture having a longitudinal fence and at least two bandsaws each having a cutting edge and a non-cutting back edge, each having its respective saw blade oriented to a respective surface of said lumber at an angle between 10° and 75° thereto and passing said lumber through said fixture from the back edges of said saw blades;
   b. guiding said lumber through said cutting fixture by biasing it against said longitudinal fence and thereby moving one of said surfaces against the first of said bandsaws; and
   c. resiliently biasing the second of said bandsaws against the other of said opposite surfaces of said lumber, thereby rough surface dressing both opposite surfaces of said lumber.

2. The method of claim 1 wherein said fixture has a third bandsaw with a band saw blade oriented at an angle from 10° to about 75° to an additional surface of said lumber, and including the step of passing said additional surface of said lumber through said fixture from the back edge of said third band saw blade.

3. The method of claim 2 wherein said fixture has a fourth bandsaw with a band saw blade at an angle from 10° to about 75° to a fourth surface of said lumber, and including the step of passing said lumber against the back edge of said fourth bandsaw.

4. A machine for dressing the surfaces of lumber having at least opposite vertical sides, a bottom surface and a top surface, said machine comprising:
 a. a support frame;
 b. a work tble surface supported on said support frame and extending substantially coextensively therewith;
 c. a fence extending along one side of said work table surface for contact by one of said vertical sides of said lumber;
 d. first and second bandsaws, each comprising at least two saw pulleys mounted on a bandsaw frame with a continuous saw blade received thereon and positioned with said saw blade oriented in a cutting relationship to a respective surface of said lumber which is at an incident angle thereto between 10° to about 75°, and power drive means operatively connected to said bandsaws;
 e. first bandsaw mounting means fixedly mounting said first bandsaw vertically on said support frame with its saw blade in said cutting relationship to said one vertical side of lumber in contact with said fence;
 f. second saw mounting means movably supporting said second bandsaw vertically on said frame, and retaining it thereon at said cutting relationship to the other of said opposite sides of said lumber; and
 g. resilient means biasing said second bandsaw against said opposite side of said lumber.

5. The machine of claim 4 wherein said second bandsaw is mounted on a vertical subframe which is pivotal in a lateral direction, with means to retain its blade at said angular orientation to its respective side of said lumber through all lateral displacement of said second bandsaw.

6. The machine of claim 4 wherein said means to retain the blade of said second bandsaw includes pivotal mounting of said bandsaw to its subframe with a parallelogram linkage.

7. The machine of claim 4 including a third of said bandsaws, with bandsaw mounting means fixedly supporting said third bandsaw horizontally on said frame in said cutting relationship to the bottom surface of said lumber.

8. The machine of claim 7 including a fourth of said bandsaws, with bandsaw mounting means to movably support said fourth bandsaw horizontally on said frame in said cutting relationship to the top surface of said lumber.

9. The machine of claim 8 wherein said fourth bandsaw is mounted on a horizontal subframe which is adjustably mounted on said support frame with means permitting its vertical displacement.

10. The machine of claim 9 including manual adjustment means for controlled vertical displacement of said horizontal subframe.

11. The machine of claim 4 including lumber feeding means operatively mounted on said work table.

12. The machine of claim 4 wherein said work table surface comprises a pair of longitudinal rails coextensive with the length of said support frame and including a plurality of rollers rotatably supported in spaced array between said longitudinal rails.

13. The machine of claim 12 including lumber feeding means operatively mounted on said work table.

14. The machine of claim 13 wherein said lumber feeding means comprises power driven roller means mountd on said support frame to bear against one of said surfaces of said lumber.

* * * * *